United States Patent
Ho et al.

(10) Patent No.: US 10,693,665 B2
(45) Date of Patent: Jun. 23, 2020

(54) POWER CONSERVATION IN POWER SOURCING EQUIPMENT

(71) Applicant: HEWLETT PACKARD ENTERPRISE DEVELOPMENT LP, Houston, TX (US)

(72) Inventors: Su Yin Ho, Singapore (SG); Kah Hoe Ng, Singapore (SG); Kay Seah Ng, Singapore (SG)

(73) Assignee: Hewlett Packard Enterprise Development LP, Houston, TX (US)

( * ) Notice: Subject to any disclaimer, the term of this patent is extended or adjusted under 35 U.S.C. 154(b) by 554 days.

(21) Appl. No.: 15/306,381

(22) PCT Filed: Apr. 24, 2014

(86) PCT No.: PCT/US2014/035373
§ 371 (c)(1),
(2) Date: Oct. 24, 2016

(87) PCT Pub. No.: WO2015/163900
PCT Pub. Date: Oct. 29, 2015

(65) Prior Publication Data
US 2017/0054567 A1    Feb. 23, 2017

(51) Int. Cl.
*H04L 12/00* (2006.01)
*H02J 13/00* (2006.01)
*H04L 12/10* (2006.01)
*G05F 1/66* (2006.01)

(52) U.S. Cl.
CPC ............... *H04L 12/10* (2013.01); *G05F 1/66* (2013.01); *H02J 13/00* (2013.01)

(58) Field of Classification Search
CPC ............ H04L 12/10; H02J 13/00; G05F 1/66
See application file for complete search history.

(56) References Cited

U.S. PATENT DOCUMENTS

| | | | |
|---|---|---|---|
| 7,664,972 B2 | 2/2010 | Diab et al. |
| 7,886,165 B2 | 2/2011 | Khan et al. |
| 8,621,250 B1 | 12/2013 | Kim et al. |
| 2006/0164769 A1 | 7/2006 | Stanford et al. |

(Continued)

FOREIGN PATENT DOCUMENTS

| JP | 7143741 A | 6/1995 |
|---|---|---|
| KR | 10-2012-0045300 A | 5/2012 |

OTHER PUBLICATIONS

"12-Port PoE/PoE+/LTPoE++ PSE Controller," LTC4270/LTC4271 Data Sheet, 2011, pp. 1-32, Linear Technology.

(Continued)

*Primary Examiner* — Rexford N Barnie
*Assistant Examiner* — Terrence R Willoughby
(74) *Attorney, Agent, or Firm* — Patent Law Group LLP

(57) ABSTRACT

A method is provided to conserve power in a power sourcing equipment (PSE) that provides a PSE port voltage at PSE ports. The method includes, in response to detecting a powered device (PD) is connected to the PSE port, providing a power supply output voltage at a default value and turning on the PSE port. After turning on the PSE port, the method includes determining the PSE port voltage. When the PSE port voltage is greater than a threshold value, the method includes decreasing the power supply output voltage.

15 Claims, 4 Drawing Sheets

(56) References Cited

U.S. PATENT DOCUMENTS

| | | | |
|---|---|---|---|
| 2007/0170909 A1* | 7/2007 | Vorenkamp | G06F 1/266 |
| | | | 324/76.11 |
| 2008/0052546 A1 | 2/2008 | Schindler et al. | |
| 2008/0151457 A1* | 6/2008 | Apfel | H04L 12/10 |
| | | | 361/111 |
| 2009/0070615 A1 | 3/2009 | Maggiolino et al. | |
| 2010/0078992 A1* | 4/2010 | Landry | H03K 17/0822 |
| | | | 307/2 |
| 2011/0258464 A1* | 10/2011 | Gammel | G06F 1/266 |
| | | | 713/300 |
| 2012/0317426 A1 | 12/2012 | Hunter et al. | |
| 2013/0036316 A1* | 2/2013 | Diab | H04L 12/10 |
| | | | 713/300 |
| 2013/0227306 A1* | 8/2013 | Santos | H04L 49/40 |
| | | | 713/300 |
| 2014/0129853 A1* | 5/2014 | Diab | H04L 12/413 |
| | | | 713/310 |

OTHER PUBLICATIONS

"Distributed Power System," DS650/DS850 Data Sheet, 2011, pp. 1-4, Rev. 03.15.11_59, Emerson Network Power.

"IEEE 802.3az-Compliant Switch with Decent Performance for Small Group Networks," 2013, pp. 1-4, ZyXEL Communications Corp.

International Search Report and Written Opinion, International Application No. PCT/US2014/035373, dated Jan. 20, 2015, pp. 1-9, KIPO.

* cited by examiner

POWER CONSERVATION IN POWER SOURCING EQUIPMENT

BACKGROUND

Power over Ethernet (PoE) is a technique for sending power over Ethernet cables. PoE follows IEEE standards including 802.3af and 802.3at. A device that provides power is called a power sourcing equipment (PSE), and a device that draws power is called a powered device (PD). A PSE may be an endpoint that provides data and power, such as a network switch or router, or a midspan that provides power but passes through data. PDs include IP phones, wireless access points, and security cameras.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

In power sourcing equipment (PSE), a power supply unit (PSU) generates a power supply output voltage that is greater than the minimum PSE port voltage specified in standards in order to compensate for the voltage drop from the PSU to the PSE ports and loads presented by power devices (PDs). For example, the PSU may generate a power supply output voltage of 54 volts (V) to provide a PSE port voltage of 52 or 53 V, which has a 1 to 2 V safety margin over the specified minimum PSE port voltage of 50 or 51 V for Type II PDs. A PSE may have as many as 24 PSE ports that are able to draw 600 milliamps (mA) per port. With 24 PSE ports fully populated by 600 mA loads, the total current drawn is 14.4 amps (A). By providing the 1 or 2 V safety margin, the PSE wastes as much as 14.4 to 28.8 watts (1 or 2 V*14.4 A). Thus what are needed are method and apparatus to conserve power over Ethernet (PoE) power.

In examples of the present disclosure, a method to conserve power is provided for a PSE that provides a PSE port voltage at PSE ports. After detecting a PD is connected to a PSE port, the PSE sets a power supply output voltage to a default value and turns on the PSE port. After turning on the PSE port, the PSE determines the PSE port voltage. When the PSE port voltage is greater than a threshold value, the PSE decreases the power supply output voltage to conserve power.

Figure 1:
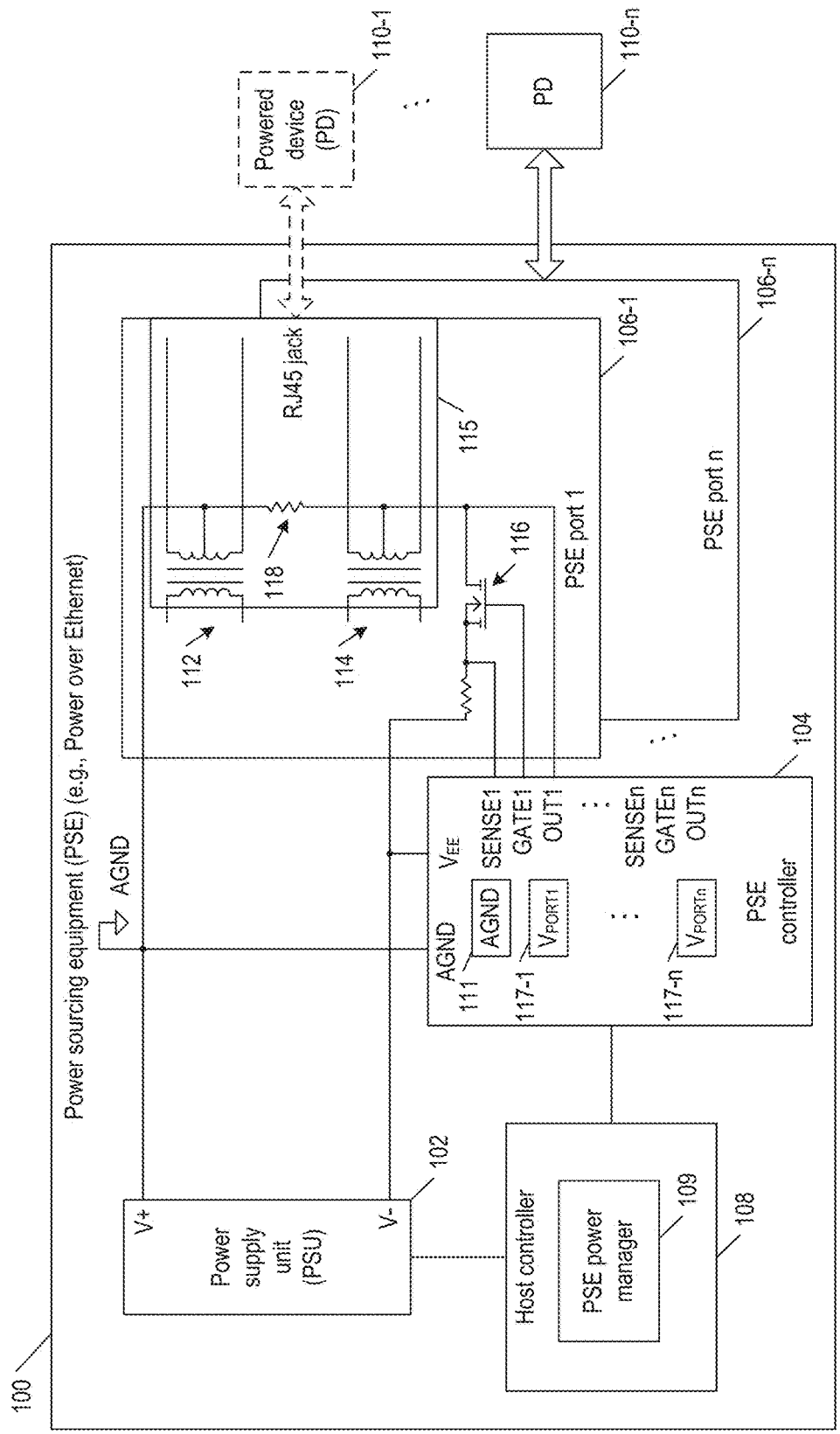
FIG. 1 is a block diagram a power sourcing equipment (PSE) in examples of the present disclosure.

FIG. 1 is a block diagram of a PSE 100 in examples of the present disclosure. PSE 100 may be an endpoint, such as a network switch or router, or a midspan. PSE 100 includes a PSU 102, a PSE controller 104, PSE ports 106-1 to 106-$n$ (collectively as "PSE ports 106" or individually as a generic "PSE port 106"), and a host controller 108. PSE ports 106-1 to 106-$n$ may be connected to respective PDs 110-1 to 110-$n$ (collectively as "PDs 110" or individually as a generic "PD 110").

PSU 102 and PSE controller 104 operate under the command of host controller 108. Host controller 108 may issue commands using inter-integrated circuit (I2C) protocol. Host controller 108 may run a PSE power manager 109 to conserve POE power.

PSU 102 has a pin V+ providing a positive power supply output voltage V+. Pin V+ is connected or coupled to the analog ground (AGND). PSU 102 also has a pin V− providing a negative power supply output voltage V− that serves as the constant potential reference.

PSE controller 104 controls the delivery of power to PSE ports 106. PSE controller 104 has a pin AGND coupled to receive voltage V+ provided by PSU 102. PSE controller 104 also has a pin $V_{EE}$ coupled to receive voltage V− provided by PSU 102. PSE controller 104 may have the ability to measure the voltage potential of pin AGND relative to pin $V_{EE}$, which is the power supply output voltage received by PSE controller 104 from PSU 102. PSE controller 104 may store voltage V+ in a register 111.

Each PSE port 106 connects or couples to data transformers 112 and 114, which may be discrete or reside in an RJ45 jack 115. Data transformers 112 and 114 have windings connected or coupled to pins of RJ45 jack 115. Data transformers 112 and 114 also have windings connected or coupled to a network physical layer (PHY) chip (not shown). Data transformer 112 may be a transmit transformer while data transformer 114 may be a receive transformer.

For each PSE port 106, voltage V+ is coupled to the center tap of the pin-facing winding of transmit transformer 112, and voltage V− is separated by a metal-oxide-semiconductor field-effect transistor (MOSFET) 116 from the center tap of the pin-facing winding of receive transformer 114. Voltage V− is provided to the source of MOSFET 116, and the drain of MOSFET 116 is coupled to the center tap of receive transformer 114.

For each PSE port 106, PSE controller 104 has a GATEn pin connected or coupled to the gate of MOSFET 116. PSE controller 104 applies the appropriate gate drive voltage to control the delivery of power to PSE port 106. When PSE controller 104 turns on MOSFET 116, a current flows from the center tap of transformer 112 through a connected PD 110 back to the center tap of transformer 114 from the potential difference between voltages V+ and V−. The potential difference between the center taps of transformers 112 and 114 is to be greater than or equal to the minimum PSE port voltage specified for PSE ports 106.

For each PSE port 106, PSE controller 104 has an OUTn pin coupled to the center tap of receive transformer 114. PSE controller 104 measure a voltage $V_{PORTn}$ at OUTn pin relative to voltage V−. PSE controller 104 stores the average voltage $V_{PORTn}$ in a register 117-$n$.

In some examples of the present disclosure, PSE controller 104 does not have the ability to measure and store voltage V+ in register 111. In these examples, PSE 100 is configured so PSE controller 104 determines voltage V+ from the voltage $V_{PORTn}$ measured at the OUTn pin of an unused PSE port 106, which is not powered on and unconnected to a PD 110. For each PSE port 106, a resistor 118 is placed between the center taps of transformers 112 and 114 to complete a path from the analog ground at voltage V+ to the OUTn pin of the PSE port 106. For an used PSE port that is not powered on and unconnected to a PD 110, the voltage $V_{PORTn}$ sensed by PSE controller 104 at the OUTn pin that PSE port 106 is voltage V+.

By monitoring voltage V+, host controller 108 is able to command PSU 104 to decrease the magnitude of its output voltage until voltage V+ is at or slightly greater than the minimum PSE port voltage specified for PSE ports 106. This allows PSE 100 to conserve power (e.g., 28.8 watts for a PSE with 24 PSE ports) compared to a PSE that maintains a constant power supply output voltage (e.g., 54 V) regardless of the actual PSE port voltage at PSE ports 106.

The previously described configuration may take into consideration the PD detection cycles performed by PSE controller 104. In a PD detection cycle, PSE controller 104 forces two currents or two voltages via OUTn pin onto PSE port 106, measures the resulting voltages or currents to form two voltage-current (V-I) points, and determines a resistance at PSE port 106 based on the slope of the two V-I points. When the resistance at PSE port 106 falls between threshold values, such as between 17 and 29 kiloohm (kΩ) or 19 and 26.5 kΩ, PSE controller 104 determines a PD 110 is connected to PSE port 106.

To assure PSE controller 104 does not mistaken resistor 118 as a PD 110 connected to PSE port 106 in a detection cycle, resistor 118 is selected to have a resistance greater than the threshold values for PD detection. For example, resistor 118 has a resistance that is 10 to 100 times greater than the threshold values. To assure the voltages created during the detection cycles do not greatly affect the measured voltage $V_{PORTn}$, which is a value averaged over time, the idle time between the detection cycles is selected to be greater than the detection cycle. For example, the idle time is 10 to 100 times greater than the detection cycle.

Figure 2:
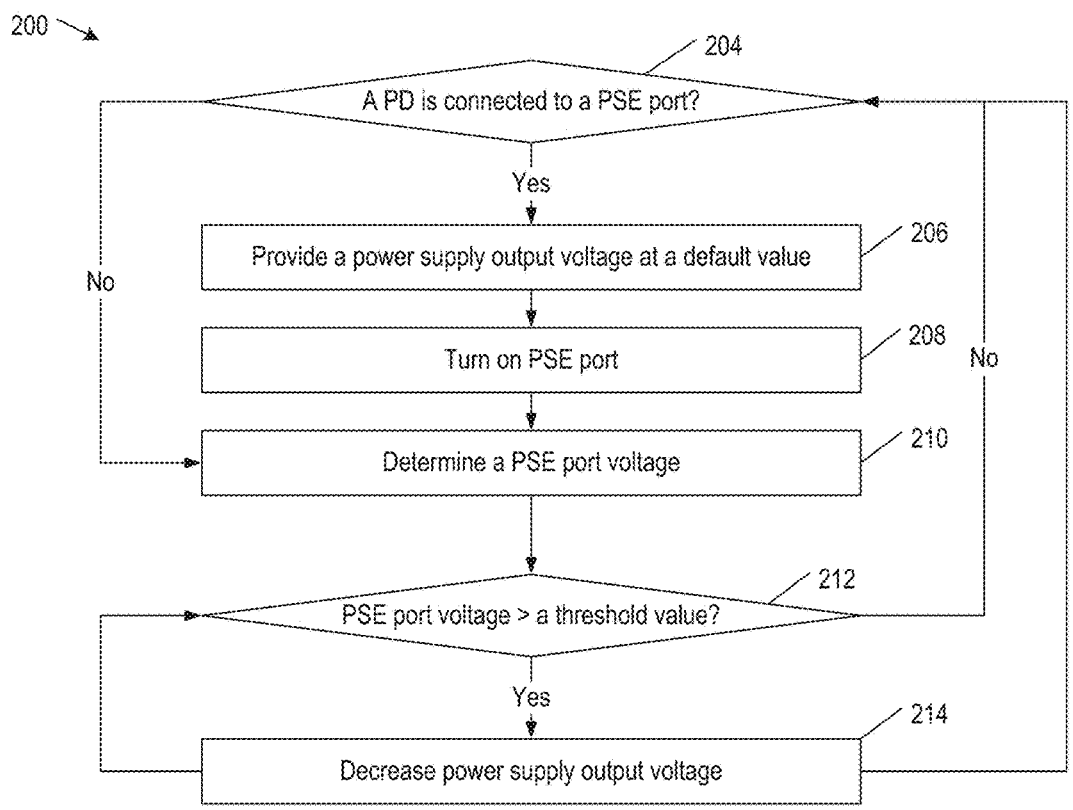
FIG. 2 is a flowchart of a method for the PSE of FIG. 1 to conserve power over Ethernet (PoE) power in providing a PSE port voltage at PSE ports in examples of the present disclosure.

FIG. 2 is a flowchart of a method 200 for PSE 100 (FIG. 1) to conserve PoE power in providing a PSE port voltage at PSE ports 106 (FIG. 1) in examples of the present disclosure. Method 200 may begin in block 202.

In block 204, PSE 100 determines if a PD 110 (FIG. 1) is connected to a PSE port 106. If so, block 204 may be followed by block 206. Otherwise block 204 may be followed by block 210.

In block 206, in response to learning a PD 110 is connected to a PSE port 106, PSE 100 provides a power supply output voltage at its default value (e.g., 54 V). PSE 100 may provide the power supply output voltage at its default value by setting the magnitude of voltage V+ to its default value. The power supply output voltage at its default value provides a PSE port voltage greater than the specified minimum (e.g., 51 V) with the voltage drops from PSU 102 to PSE ports 106 and PSE ports 106 populated with PDs 106. As noted above, the default value causes PSE 100 to waste power. Block 206 may be followed by block 208.

In block 208, PSE 100 turns on PSE port 106 with the newly connected PD 110. Block 208 may be followed by block 210.

In block 210, after turning on PSE port 106 with the newly connected PD 110, PSE 100 determines the PSE port voltage. PSE 100 may determine the PSE port voltage by reading register 111 that stores the value of voltage V+. When PSE 100 does not have a register 111 that stores the value of voltage V+, PSE 100 may read a register 117 corresponding to an unused PSE port 106, which also stores the value of voltage V+. Block 210 may be followed by block 212.

In block 212, PSE 100 determines if the PSE port voltage is greater than a threshold voltage (e.g., 51 or 51.5 V). If so, block 212 may be followed by block 214. Otherwise block 212 may loop back to block 204 to repeat method 200.

In block 214, PSE 100 decreases the power supply output voltage by a unit (e.g., 0.1, 0.25, or 0.5 V). PSE 100 may decrease the power supply voltage by decreasing the magnitude of voltage V+. Block 214 may loop back to block 204 to repeat method 200.

Figure 3:
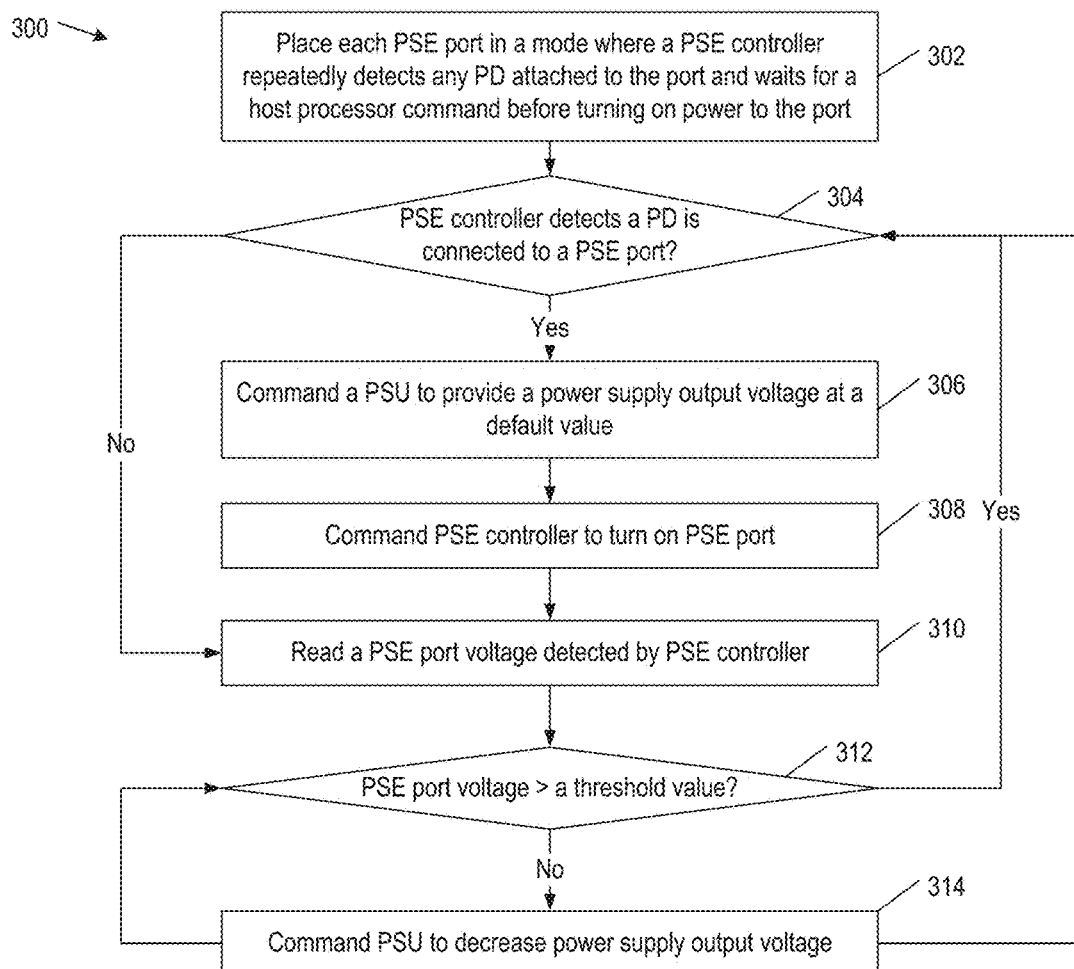
FIG. 3 is a flowchart of a method for a host controller in the PSE of FIG. 1 to implement the method of FIG. 2 in examples of the present disclosure.

FIG. 3 is a flowchart of a method 300 for host controller 108 (FIG. 1) to implement method 200 in examples of the present disclosure. Method 300 may begin in block 302.

In block 302, host controller 108 places each PSE port 106 (FIG. 1) in a mode (e.g., a semi-automatic mode) where PSE controller 104 repeatedly attempts to detect any PD attached to the PSE port but waits for a host controller command before turning on power to the PSE port. Alternatively host controller 108 places each PSE port 106 in a manual mode and repeatedly commands PSE controller 104 to run detection cycles on the PSE port. As described above, idle time of the appropriate duration separates the detection cycles. Block 302 may be followed by block 304.

In block 304, host controller 108 determines if PSE controller 104 has detected a PD 110 (FIG. 1) is connected to a PSE port 106. If so, block 304 may be followed by block 306. Otherwise block 304 may be followed by block 310. Block 304 corresponds to the previously described block 204 (FIG. 2).

In block 306, in response to learning a PD 110 is connected to a PSE port 106, host controller 108 commands PSU 102 to provide a power supply output voltage at its default value (e.g., 54 V). Host controller 108 may command PSU 102 to provide the power supply voltage at its default value by setting the magnitude of power supply output voltage V+ to its default value. Block 306 may be followed by block 308. Block 306 corresponds to the previously described block 206 (FIG. 2).

In block 308, host controller 108 commands PSE controller 104 to turn on the PSE port 106 with the newly connected PD 110. Block 308 may be followed by block 310. Block 308 corresponds to the previously described block 208 (FIG. 2).

In block 310, after turning on PSE port 106 with the newly connected PD 110, host controller 108 reads a PSE port voltage from a register in PSE controller 104. Host controller 108 may read register 111 of PSE controller 104 that stores the value of voltage V+. When PSE controller 104 does not have a register 111 that stores voltage V+, host controller 108 may read a register 117 corresponding to an unused PSE port 106 that also stores the value of voltage V+. Block 310 may be followed by block 312. Block 310 corresponds to the previously described block 210 (FIG. 2).

In block 312, host controller 108 determines if the PSE port voltage is greater than a threshold voltage (e.g., 51 or 51.5 V). If so, block 312 may be followed by block 314. Otherwise block 312 may loop back to block 304 to repeat method 300. Block 312 corresponds to the previously described block 212 (FIG. 2).

In block 314, host controller 108 commands PSU 102 to decrease the power supply output voltage by a unit (e.g., 0.1, 0.25, or 0.5 V). PSU 102 may decrease the power supply voltage by decreasing the magnitude of voltage V+. Block 314 may loop back to block 304 to repeat method 300. Block 314 corresponds to the previously described block 214 (FIG. 2).

Figure 4:
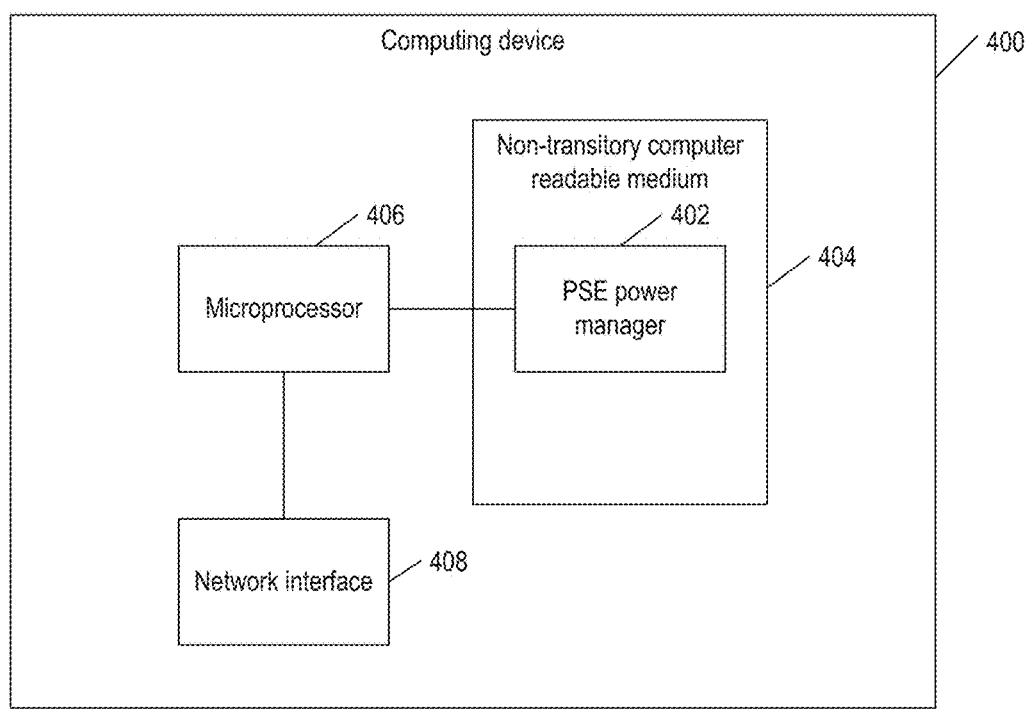
FIG. 4 is a block diagram of a device for implementing the host controller of FIG. 1 in examples of the present disclosure.

FIG. 4 is a block diagram of a device 400 for implementing host controller 108 (FIG. 1) in examples of the present disclosure. Code 402 for a PSE power manager 109 (FIG. 1) that conserves power is stored in a non-transitory computer medium 404, such as a read-only memory. A microprocessor 406 executes code 402 to provide the described features and functionalities. Microprocessor 406 communicates with PSE controller 104 and PSU 102 via a network interface 408, such as an I2C interface.

In some examples, voltage V− may be applied to the center tap of transmit transformer 112 and voltage V+ may be applied to the center tap of receive transformer 114. In other examples of the present disclosure, PSU 102 may be negatively grounded so PSE 100 is modified to operate by adjusting voltage V−. Various other adaptations and combinations of features of the examples disclosed are within the scope of the present disclosure.

What is claimed is:

1. A power sourcing equipment (PSE) to provide a PSE port voltage at PSE ports, comprising:
   the PSE ports;
   a power supply unit (PSU) to supply a power supply output voltage;
      a first data transformer with a first winding and a first center tap of the first winding coupled to receive a positive power supply output voltage from the PSU;
      a second data transformer with a second winding and a second center tap of the second winding coupled to receive a negative power supply output voltage from the PSU; and
   a resistor coupled between the first and the second center taps;
      a PSE controller to receive power from the PSU, perform powered device (PD) detection on the PSE ports, and selectively turn on the PSE ports, wherein the PSE controller:
         has a first pin coupled to receive the negative power supply output voltage from the PSU;
         has a second pin coupled to the second center tap to measure the PSE port voltage from the second pin;
         stores a value of the PSE port voltage in a register; and
         determines from the PSE controller the PSE port voltage by reading the register;
      a host controller to:
         command the PSU to supply the power supply output voltage to the PSE port at a default value;
         command the PSE controller to turn on the PSE port;
         after the PSE controller turns on the PSE port, determine from the PSE controller the PSE port voltage; and
   in response to a determination that the determined PSE port voltage is greater than a minimum specified PSE port voltage, command the PSU to decrease the power supply output voltage supplied to the PSE port.

2. The PSE of claim 1, wherein the default value is greater than the minimum specified PSE port voltage, and wherein the minimum specified PSE port voltage is specified in a PSE standard.

3. The PSE of claim 1, wherein:
   the PSE controller:
      has a first pin coupled to receive a positive power supply output voltage from the PSU, and a second pin coupled to receive a negative power supply output voltage from the PSU;
      measures the PSE port voltage from the first and the second pins; and
      stores a value of the PSE port voltage in a register; and
   the host controller determines from the PSE controller the PSE port voltage by reading the register.

4. The PSE of claim 1, wherein the resistor has a resistance greater than threshold values for PD detection.

5. The PSE of claim 1, wherein the value comprises an average value and an idle time between detection cycles performed by the PSE controller is greater than the detection cycle.

6. The PSE of claim 1, wherein the PSE comprises an Ethernet switch and the PSE ports are Ethernet ports.

7. A method comprising:
   supplying, by a power supply unit (PSU), a power supply output voltage;
   receiving, by a PSE controller, power from the PSU, wherein the PSE controller:
      has a first pin coupled to receive the negative power supply output voltage from the PSU,
      has a second pin coupled to the second center tap to measure the PSE port voltage from the second pin,
      stores a value of the PSE port voltage in a register, and
      determines from the PSE controller the PSE port voltage by reading the register;
   performing, by the PSE controller, powered device (PD) detection on PSE ports including;
      receiving, by a first data transformer, a positive power supply output voltage from
         the PSU, the first data transformer having a first winding and a first center tap of the first winding, and
      receiving, by a second data transfer, a negative power supply output voltage from
         the PSU, the second data transformer having a second winding and a second center tap of the second winding coupled to and a resistor coupled between the first and the second center taps;
   selectively turning on the PSE ports;
   commanding, by a host controller, the PSU to supply the power supply output voltage to the PSE port at a default value, and the PSE controller to turn on the PSE port;
   determining, after the PSE controller turns on the PSE port, from the PSE controller the PSE port voltage; and
   in response to a determination that the determined PSE port voltage is greater than a minimum specified PSE port voltage, commanding the PSU to decrease the power supply output voltage supplied to the PSE port.

8. The method of claim 7, wherein the default value is greater than the minimum specified PSE port voltage, and wherein the minimum specified PSE port voltage is specified in a PSE standard.

9. The method of claim 7, wherein:
   the PSE controller:
      has a first pin coupled to receive a positive power supply output voltage from the PSU, and a second pin coupled to receive a negative power supply output voltage from the PSU;
      measures the PSE port voltage from the first and the second pins; and
      stores a value of the PSE port voltage in a register; and
   the host controller determines from the PSE controller the PSE port voltage by reading the register.

10. The method of claim 7, wherein the resistor has a resistance greater than threshold values for PD detection.

11. The method of claim 7, wherein the value comprises an average value and an idle time between detection cycles performed by the PSE controller is greater than the detection cycle.

12. The method of claim 7, wherein the PSE comprises an Ethernet switch and the PSE ports are Ethernet ports.

13. A non-transitory computer readable medium encoded with executable instructions for execution by a processor for a power sourcing equipment (PSE) to:
  supply, by a power supply unit (PSU), a power supply output voltage;
  receive, by a PSE controller, power from the PSU, wherein the PSE controller:
    has a first pin coupled to receive the negative power supply output voltage from the PSU,
    has a second pin coupled to the second center tap to measure the PSE port voltage from the second pin,
    stores a value of the PSE port voltage in a register, and
  determines from the PSE controller the PSE port voltage by reading the register;
  perform, by the PSE controller, powered device (PD) detection on PSE ports including;
    receiving, by a first data transformer, a positive power supply output voltage from
the PSU, the first data transformer having a first winding and a first center tap of the first winding, and
    receiving, by a second data transfer, a negative power supply output voltage from
the PSU, the second data transformer having a second winding and a second center tap of the second winding coupled to and a resistor coupled between the first and the second center taps;
  selectively turn on the PSE ports;
  command, by a host controller, the PSU to supply the power supply output voltage to the PSE port at a default value, and the PSE controller to turn on the PSE port;
  determine, after the PSE controller turns on the PSE port, from the PSE controller the PSE port voltage; and
  in response to a determination that the determined PSE port voltage is greater than a minimum specified PSE port voltage, command the PSU to decrease the power supply output voltage supplied to the PSE port.

14. The non-transitory computer readable medium of claim 13, wherein the default value is greater than the minimum specified PSE port voltage, and wherein the minimum specified PSE port voltage is specified in a PSE standard.

15. The non-transitory computer readable medium of claim 13, wherein:
  the PSE controller:
    has a first pin coupled to receive a positive power supply output voltage from the PSU, and a second pin coupled to receive a negative power supply output voltage from the PSU;
    measures the PSE port voltage from the first and the second pins; and
    stores a value of the PSE port voltage in a register; and
  the host controller determines from the PSE controller the PSE port voltage by reading the register.

* * * * *